Patented June 17, 1952

2,600,691

UNITED STATES PATENT OFFICE 2,600,691

HALOGENATED AROMATIC COMPOUNDS

Sidney D. Ross and Moushy Markarian, North Adams, Mass., assignors to Sprague Electric Company, North Adams, Mass., a corporation of Massachusetts No Drawing. Application October 5, 1948, Serial No. 52,982

3 Claims. (Cl. 260—649).

This invention relates to new halogenated aromatic compounds.

It is an object of this invention to produce new benzene derivatives which are useful as intermediates and in the electrical and plastics industries.

In its broad embodiments, the invention is concerned with compounds conforming to the general formula:

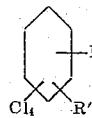

wherein R represents an aralkyl hydrocarbon radical which may be further substituted and R' represents an alkyl or aralkyl hydrocarbon radical which may be further substituted. In one of its limited embodiments, this invention is concerned with compounds conforming to the general formula:

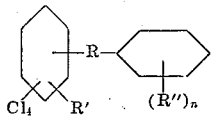

wherein R and R' represent aliphatic hydrocarbon radicals containing from one to two carbon atoms, R'' represents hydrogen or a hydrocarbon radical; and $n$ represents an integer from 1 to 5. In another limited embodiment, this invention is concerned with compounds conforming to the general formula:

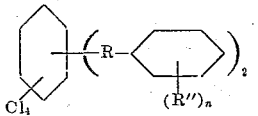

wherein R represents an aliphatic hydrocarbon radical containing from one to two carbon atoms; R'' represents hydrogen or a hydrocarbon radical; and $n$ represents an integer from 1 to 5.

According to our invention, we have prepared a new series of compounds in which four halogen atoms appear on a fully substituted benzene ring. These compounds, for the most part, possess unusual chemical and electrical stability.

Among the compounds conforming to the first general formula, referred to previously, the following are representative:

1-propyl-2-benzyl-3,4,5,6-tetrachlorobenzene
1-propyl-3-benzyl-2,4,5,6-tetrachlorobenzene
1-propyl-4-benzyl-2,3,5,6-tetrachlorobenzene
1 - methyl - 2 - (alphaphenylisopropyl) - 3,4,5,6-tetrachlorobenzene
1 - methyl - 3 - (alphaphenylisopropyl) - 2,4,5,6-tetrachlorobenzene
1 - methyl - 4 - (alphaphenylisopropyl) - 2,3,5,6-tetrachlorobenzene
1 - ethyl - 2 - (alphaphenylisopropyl) - 3,4,5,6-tetrachlorobenzene
1 - isopropyl - 2 - (alphaphenylisopropyl) -3,4,5,6-tetrachlorobenzene
1 - butyl - 2 - (alphaphenylisopropyl) - 3,4,5,6-tetrachlorobenzene
1 - amyl - 2 - (alphaphenylisopropyl) - 3,4,5,6-tetrachlorobenzene
1 - isopropyl - 2 - (alphaphenylethyl) - 3,4,5,6-tetrachlorobenzene
1 - butyl - 2 - (betaphenylethyl) - 3,4,5,6 - tetrachlorobenzene
1-butyl-3-benzyl-2,4,5,6-tetrachlorobenzene
1-(alphanaphthyl)-3,4,5,6-tetrachloro-o-xylene
1 - ethyl - 2(alpha(3 - tolyl)isopropyl) - 3,4,5,6-tetrachlorobenzene
1 - butyl - 4(3,5-dimethylbenzyl) - 2,3,5,6 - tetrachlorobenzene
1 - methyl - 3(p-biphenylmethyl) - 2,4,5,6 - tetrachlorobenzene Among the preferred compounds which conform to the second general formula, referred to previously, are the following:

1-methyl-2-benzyl-3,4,5,6-tetrachlorobenzene
1-methyl-3-benzyl-2,4,5,6-tetrachlorobenzene
1-methyl-4-benzyl-2,3,5,6-tetrachlorobenzene
1-ethyl-2-benzyl-3,4,5,6-tetrachlorobenzene
1-ethyl-3-benzyl-2,4,5,6-tetrachlorobenzene
1 - methyl - 2 - (alphaphenylethyl) - 3,4,5,6-tetrachlorobenzene
1 - methyl - 3 - (alphaphenylethyl) - 2,4,5,6-tetrachlorobenzene
1 - methyl - 2 - (betaphenylethyl) - 3,4,5,6-tetrachlorobenzene
1 - methyl - 3 - (betaphenylethyl) - 2,4,5,6 - tetrachlorobenzene
1 - ethyl - 2 - (alphaphenylethyl) - 3,4,5,6 - tetrachlorobenzene
1 - ethyl - 2 - (betaphenylethyl) - 3,4,5,6 - tetrachlorobenzene
1 - methyl - 2 - (2 - methyl benzyl) - 3,4,5,6 - tetrachlorobenzene
1 - ethyl - 2 - (alpha(3 - methyl phenyl)ethyl) - 3,4,5,6-tetrachlorobenzene
1 - methyl - 2 - (3 - methyl benzyl)-3,4,5,6-tetrachlorobenzene
1 - methyl - 2(4 - methylbenzyl) - 3,4,5,6 - tetrachlorobenzene 1 - methyl - 3(3 - methylbenzyl) - 2,4,5,6 - tetrachlorobenzene Among the preferred compounds which conform to the third general formula, referred to previously, are the following:

1,2 - bis(betaphenylethyl) - 3,4,5,6 - tetrachlorobenzene
1,3 - bis(betaphenylethyl) - 2,4,5,6 - tetrachlorobenzene
1,4 - bis(betaphenylethyl) - 2,3,5,6 - tetrachlorobenzene
1,2 - bis(alphaphenylethyl) - 3,4,5,6 - tetrachlorobenzene
1,3 - bis(alphaphenylethyl) - 2,4,5,6 - tetrachlorobenzene
1,4 - bis(alphaphenylethyl) - 2,3,5,6 - tetrachlorobenzene
1,2 - dibenzyl - 3,4,5,6 - tetrachlorobenzene
1 - benzyl - 2(betaphenylethyl) - 3,4,5,6 - tetrachlorobenzene
1 - benzyl - 2(alphaphenylethyl) - 3,4,5,6 - tetrachlorobenzene
1 - (alphaphenylethyl) - 2 - (betaphenylethyl) - 3,4,5,6 - tetrachlorobenzene
1,2 - di(x - methylbenzyl) - 3,4,5,6 - tetrachlorobenzene
1,3 - di(x - methylbenzyl) - 2,4,5,6 - tetrachlorobenzene
1,2 - di(alpha(x - methylphenyl)ethyl) - 3,4,5,6 - tetrachlorobenzene
1,2 - di(beta(x - methylphenyl)ethyl) - 3,4,5,6 - tetrachlorobenzene While our invention is directed to compounds in which the hydrocarbon radicals may be substituted in ortho, meta and para positions (with respect to each other) on the halogenated benzene nucleus, this invention in its preferred embodiment is concerned with compounds in which the hydrocarbon groups are substituted in positions ortho to each other on the halogenated ring.

Our invention may be more readily understood by a consideration of the following illustrative examples, wherein the quantities are given in parts by weight unless otherwise stated:

EXAMPLE I

Preparation of tetrachloro-o-xylene

A mixture of sulfur monochloride (12.8 g.) and sulfuryl chloride (1280 g.) was added dropwise with external cooling to a stirred suspension of aluminum chloride (10 g.) in orthoxylene (212 g.; 2 moles). During the first one-half of the addition the temperature was maintained at 25-30° C. When the temperature started to drop, heat was gradually applied until in the last stages the reflux temperature of the chlorinating mixture was attained. At the end of the reaction the mixture was almost completely solid. The remaining chlorinating mixture was removed with a water pump. Water was then added to destroy the aluminum chloride. The crude product was then filtered, dried, and crystallized from trichloroethylene to yield 226 g. of product melting from 224-226° C. A sample, crystallized for analysis three times from carbon tetrachloride, melted from 226.5-227.5° C.

Anal.—Calcd. for $C_8H_6Cl_4$: C, 39.35; H, 2.46. Found: C, 39.15, 39.01; H, 2.39, 2.50.

EXAMPLE II

Prep. of 1-methyl-2-bromomethyl-3,4,5,6-tetrachlorobenzene

Bromine (150 g.; 0.94 mole) was added dropwise to a stirred suspension of tetrachloro-o-xylene (produced as in Example I) in carbon tetrachloride (330 cc.) and chloroform (700 cc.) illuminated with a 500 watt bulb. When the bromine color disappeared the solution was evaporated to one-half its volume. On cooling 100 g. of solid deposited. The solid proved to be a mixture of the desired bromide and tetrachloro-o-xylene. These two components were separated by treating the solid with trichloroethylene (150 cc.). The unreacted tetrachloro-o-xylene (53 g.) was insoluble while the bromide (36 g.) of M. P. 93-97° C. was obtained from the solution by evaporation of the solvent. The mother liquor from this first batch of product was evaporated almost to dryness and ethanol was then added. On cooling another crop of the crude bromide (114 g.) of melting point 90-94° C. was obtained. A sample, crystallized for analysis three times from 95% alcohol, melted from 100.5-101.5° C.

Anal.—Calcd. for $C_8H_5Cl_4Br$: C, 29.70; H, 1.55. Found: C, 29.42, 29.69; H, 1.50, 1.59.

EXAMPLE III

Prep. of 1,2-bis-bromomethyl-3,4,5,6-tetrachlorobenzene

Bromine (640 g.; 4 moles) was added dropwise at room temperature to a stirred solution of tetrachloro-o-xylene (produced as in Example I) (488 g.; 2 moles) in carbon tetrachloride (1.5 liters) illuminated with a 500 watt bulb. When the bromine color disappeared the solvent was distilled off until the liquid temperature reached 110° C. On cooling it crystallized. The crude product was pressed dry on filter paper and then crystallized from two liters of acetone-methanol (4:1). This gave 762 g. (94.8%) of the dibromide melting from 114.5-116° C. A sample, crystallized for analysis three times from S. D. A.-30 carbon tetrachloride (2:1) and once from acetone, melted from 115.5-116.5° C.

Anal.—Calcd. for $C_8H_4Cl_4Br_2$: C, 23.88; H, 1.00. Found: C, 23.99, 24.08; H, 1.01, 1.08.

EXAMPLE IV

Prep. of 1-methyl-2-benzyl-3,4,5,6-tetrachlorobenzene 1-methyl-2-bromomethyl-3,4,5,6 - tetrachlorobenzene (produced in Example II) (32.3 g.; 0.1 mole) in benzene (200 cc.) was added dropwise to a stirred suspension of aluminum chloride (0.5 g.) in benzene (200 cc.). Stirring was continued five hours and then the reaction mixture was decomposed with 10% sodium hydroxide. The benzene layer was separated, dried and distilled. The desired product boiled at 155° C. at 0.9 mm. It was crystallized from benzene-ethanol (1:1) yielding 25 g. (78%) melting from 87-88° C. A small sample recrystallized for analysis melted from 87.5-89° C.

Anal.—Calcd. for $C_{14}H_{10}Cl_4$: C, 52.58; H, 3.15. Found: C, 52.60, 52.41; H, 3.02, 3.16.

EXAMPLE V

Prep. of 1,2-dibenzyl-3,4,5,6-tetrachlorobenzene 1,2-bisbromomethyl-3,4,5,6-tetrachlorobenzene (prepared as in Example III) (40.1 g.; 0.1 mole) in 200 cc. benzene was added dropwise at room temperature to a stirred suspension of aluminum chloride (0.5 g.) in 200 cc. of benzene. Stirring was continued for six hours and the reaction mixture was then left standing overnight. The crude product was isolated in the usual manner. Distillation at 0.09 mm. gave a middle fraction of B. P. 170–220° C. and weighing 24 g. Crystallization of this fraction from ethanol-benzene gave 21 g. (53%) of M. P. 161–164° C. Two additional crystallizations raised the melting point to 164–165.5° C.

Anal.—Calcd. for $C_{20}H_{14}Cl_4$: C, 60.68; H, 3.56. Found: C, 60.79, 60.94; H, 2.94, 3.06.

While the examples given above have been concerned with the preparation of ortho isomers, the described procedures are equally applicable to the preparation of the meta and para isomers. In the case of the benzyl compounds, meta and para xylenes would be employed instead of ortho-xylene. Other compounds of the preferred category, e. g. in which the aliphatic hydrocarbon radicals contain one or two carbon atoms, may be produced by starting with o-, m- and p-ethyl toluene and o-, m- and p- diethyl benzene. Other compounds of the invention may be produced from dialkyl benzenes in which one or both alkyl groups contain more than two carbon atoms.

Preparation of the compounds of Examples IV and V from the bromo-intermediate may be carried out with the corresponding chloro-intermediate.

The compounds of our invention are exceptionally stable to severe chemical and electrical conditions. They are especially useful as electrical insulating materials, either alone or in admixture with other dielectric materials. The electrical loss (power factor) of these compounds is very low, and their dielectric constant appreciably higher than that of a pure hydrocarbon. Compounds with ortho-substituted hydrocarbon radicals generally possess the highest dielectric constant. The high halogen content of these compounds adapts them for use at elevated temperatures, since they possess very high flash points.

While these compounds are useful for electrical applications, they are also of value as heat transfer agents, plasticizers for resins, modifiers for lubricating oils, as intermediates and in other applications. In those instances where their electrical properties are not of importance the non-halogenated aryl nucleus may be further substituted with groups which impart other properties to the compounds. For example, the aryl ring may have one or more nitro, sulfate, methoxy, amino, hydroxy, trifluoromethyl and other groups substituted thereon. Thus, an amino substituted compound might be useful in the preparation of diazo intermediates, which in turn could be coupled to form an azo pigment. Sulfonation of the non-halogenated aryl ring may be used to increase the water solubility of the compounds.

For electrical purposes, the non-halogenated aryl ring may be further substituted, but the substituents are preferably hydrocarbon groups. For example, it is possible to couple the bromo intermediate with toluene, ethyl benzene, xylene or other substituted aryl hydrocarbons. In this manner, lower melting points and even liquid products may be produced, if desired.

While we are not fully aware of the reasons for the unusual stability of our compounds, it is our belief that this is due to the fact that hydrogen and chlorine atoms do not appear on the same or adjacent carbon atoms.

As many apparently widely different embodiments of this invention may be made without departing from the spirit and scope hereof, it is to be understood that this invention is not limited to the specific embodiments hereof, except as defined in the appended claims.

We claim:

1. A compound conforming to the general formula

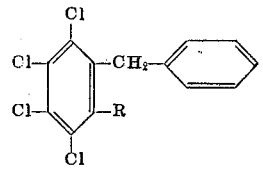

wherein R represents a group selected from the class consisting of benzyl and alkyl radicals.

2. 1-methyl-2-benzyl - 3,4,5,6 - tetrachlorobenzene.

3. 1,2-dibenzyl-3,4,5,6-tetrachlorobenzene.

SIDNEY D. ROSS.
MOUSHY MARKARIAN.

REFERENCES CITED

The following references are of record in the file of this patent:

UNITED STATES PATENTS

| Number | Name | Date |
|---|---|---|
| 2,012,302 | Clark et al. | Aug. 27, 1935 |
| 2,244,284 | Britton et al. | June 3, 1941 |